Jan. 23, 1940. E. A. RYDER 2,187,755
METHOD OF FORMING BEARINGS
Filed Dec. 11, 1936
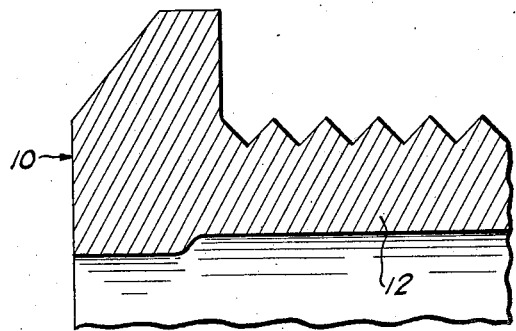
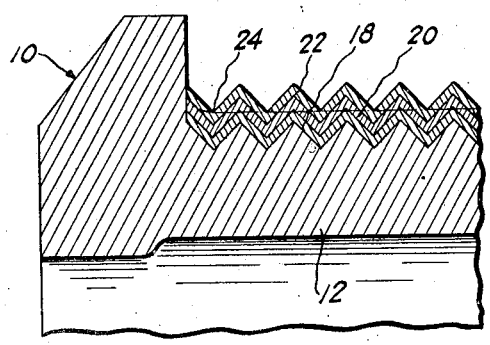
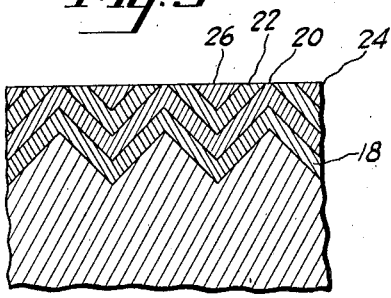
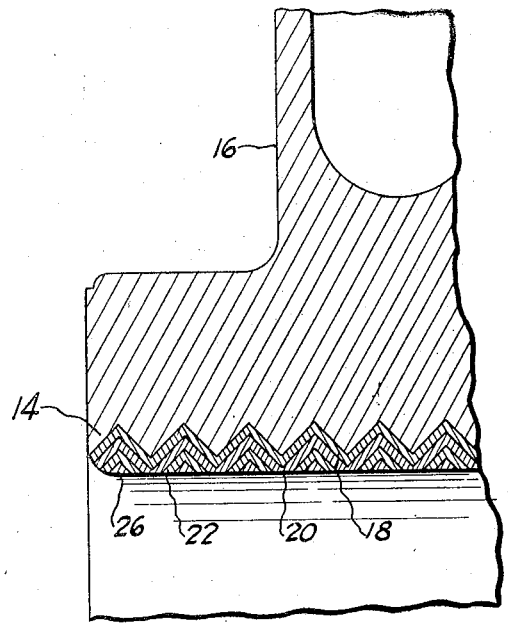
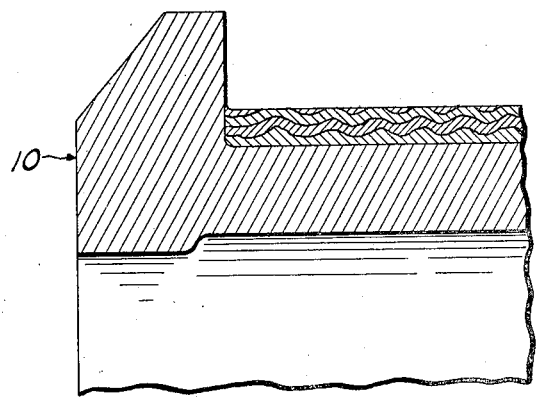
INVENTOR.
Earle A. Ryder
BY Harris G. Luther
ATTORNEY Patented Jan. 23, 1940

2,187,755

UNITED STATES PATENT OFFICE 2,187,755

METHOD OF FORMING BEARINGS

Earle A. Ryder, West Hartford, Conn., assignor to United Aircraft Corporation, East Hartford, Conn., a corporation of Delaware Application December 11, 1936, Serial No. 115,377

15 Claims. (Cl. 29—149.5)

This invention relates to improvements in methods of forming bearings and has particular reference to an improved method for applying bearing material directly onto the material receiving surface of a portion of a machine element such as the journal portion of a rotatable shaft or the journal supporting portion of a machine bed, frame, or casing.

An object of the invention resides in the provision of an improved method of applying bearing material directly to the material receiving surface of a machine element such as exemplified above.

A somewhat more specific object resides in the provision of an improved method of electroplating the bearing material directly onto the material receiving surface of the machine element.

An additional object resides in the provision of an improved method by means of which bearing materials of different characteristics may be applied to the material receiving surface of a machine element in such a manner that the materials will be present in alternating areas of the finished bearing surface.

Other objects and advantages will be more particularly pointed out hereinafter or will become apparent as the description proceeds.

In the accompanying drawing in which like reference numerals are used to designate similar parts or portions throughout, there is illustrated the now preferred manner in which the process of the invention may be practically applied. The drawing, however, is for the purpose of illustration only and is not to be taken as in any way limiting the invention, the scope of which is to be measured entirely by the scope of the appended claims.

In the drawing, Fig. 1 is a sectional view of a fragmentary portion of a machine element having a surface to which bearing material is to be applied and illustrates the initial stage of preparing the surface of the machine elements for the reception of the bearing material.

Fig. 2 is a view of a machine element similar to Fig. 1 and illustrates a stage in the method at which a quantity of bearing material has been applied to the material receiving surface of the machine element.

Fig. 3 is a sectional view of a portion of the bearing receiving surface of a machine element and a bearing layer of suitable bearing material applied thereto and illustrates a stage in the process in which the bearing material has been subjected to suitable machining or other operation to provide a bearing of specified dimensions and surface finish.

Fig. 4 is a sectional view of a machine element complementary to the element illustrated in Figs. 1, 2 and 3, and illustrates the alternative arrangement of applying the bearing material directly to the surface of the journal receiving element instead of to the surface of the journal, and Fig. 5 is a sectional view of a machine element similar to that illustrated in Figs. 1 and 2 showing a slightly modified method of applying the bearing material to the bearing receiving surface of the machine element such as to the surface of the journal portion of a rotatable shaft.

Referring to the drawing in detail, the numeral 10 generally indicates a machine element which may be in the form of a rotatable shaft rotatably supported in complementary machine elements integral with, or secured to the bed, frame or casing of a machine. The machine element 10 is illustrated as having a journal portion 12 rotatably received in the complementary supporting machine element. It is well known in the mechanical arts that in order to provide for prolonged rotation of a journal in a journal box, it is necessary to provide some form of friction reducing structure between the journal and the journal-supporting box as well as to provide adequate lubrication for such a bearing. Such friction-reducing structures have usually taken the form of separate members inserted between the journal and the adjacent surface of the journal box, such members usually being formed of a material softer than the material of the journal or of a soft material applied to a backing member of hard material. It is among the objects of this invention to eliminate the separate intermediate bearing members and apply a suitable bearing material directly to the bearing surface either of the journal or of the journal receiving box or supporting member.

According to a preferred method of accomplishing the above stated object, the surface of that portion of the machine element that is to receive the bearing material is first roughened. As exemplified in Figs. 1 and 2 this roughening may take the form of a plurality of angular grooves provided in the surface of the bearing material receiving portion of the machine element. These grooves may be formed to extend in any desired direction either transversely of or parallel to the axis of the journal portion or at some spiral inclination between the two directions mentioned.

After the bearing receiving portion of the machine element has been suitably roughened as illustrated for example in Fig. 1, the surface is thoroughly cleaned to provide a clean contact surface for the bearing material that is to be subsequently applied.

After the roughened surface of the machine element has been thoroughly cleaned, a suitable bearing material such as copper, silver, lead, etc., is electroplated onto the surface to provide a layer of bearing material having a thickness somewhat greater than the thickness of bearing material desired in the finished bearing as illustrated in Fig. 2.

After a sufficient thickness of bearing material has been plated onto the machine element, the layer of bearing material is subjected to suitable mechanical operation to reduce it to the specified dimension and to provide the desired surface finish as exemplified in Fig. 3.

Obviously, the bearing material may be applied to the journal portion 12 of a rotatable shaft elements 10 as illustrated in Figs. 1, 2 and 3 and may alternatively be applied to the surface of the journal receiving portion 14 of a complementary machine element 16 which is either mounted upon or supports the journal of the rotatable elements 10.

As a suitable example, the bearing material may be applied to the crankpin surface of the crankshaft of an engine or may be applied to the crankpin surrounding surface of a connecting rod mounted upon the crankpin and may also be applied to the surface of the main bearing journal of the crankshaft or to the journal surrounding surfaces of the main bearing housing secured to the casing or frame of the engine. Whether the bearing material is applied to the journal portion of one element or to the journal receiving portion of another element in no way affects the scope of the invention.

While a bearing containing only a single constituent has been found to be satisfactory in many applications, in other applications it has been found desirable to provide a bearing material containing two or more constituents of somewhat different characteristics. In such a case, it has been found to be highly desirable that all of the constituent elements of the bearing material should be present in the surface of the bearings. This object is accomplished in the improved method of this invention by applying alternate layers of the bearing material constituents such as copper and lead to the roughened bearing material receiving surface. As illustrated in Fig. 1 a layer of plating 18 of one constituent element is first supplied to the roughened surface. Subsequently, a second layer 20 of a different constituent material is applied over the layer 18 and, if desired, a third layer of constituent material either the same as the material of the layer 18 or different from both of the materials constituting the layers 18 and 20 may be applied over the layer 20. Other layers may be plated on as may be necessary or desired to provide the requisite thickness of bearing material. As particularly illustrated in Figs. 2, 3 and 4 the various alternate layers of bearing material follow the contours of the roughened surface to which they are applied and intersect the surface of a cylinder indicated by the broken line 24 in Fig. 2 which delineates the surface of the finished bearing. When the portions of bearing material extending beyond the surface of the cylinder indicated by the line 24 have been machined away, the surface of the bearing presents alternate areas of the different bearing material constituents as indicated at 20, 22 and 26 in Figs. 3 and 4. The layer 18 which does not project through the surface of the bearing in the construction illustrated may be a bonding layer or may be provided to permit a certain amount of wear of the bearing material or if the particular application does not require such a layer may be omitted entirely.

Where a bearing material containing a single constituent is used, it is, of course, unnecessary to roughen the bearing material receiving surface to provide alternate areas of successive layers of bearing material in the surface of the bearings, as described above. In such a case, bearing material may be plated directly onto the finished or smooth bearing material receiving surface of the machine element as illustrated in Fig. 5.

Even where a bearing material containing different constituent elements is used, it has been found that particularly in cases where the entire body of bearing material is relatively thin, a bearing having alternate areas of the various constituent elements of the bearing material in its finished surface may be provided by plating the bearing material in alternate layers of the various constituents directly onto the bearing material receiving surface without the necessity of first roughening the surface. This condition arises because of the variation in the thickness of the plating of the various materials due to local variations in the conductivity of the machine element and the plating electrolyte, and other possible conditions which cause a greater quantity of material to be plated in one area than in another. When the successive layers are very thin they will intermix and when the bearing material is brought to its final condition as to dimensions and surface finish, areas of the various constituent elements of the bearing material will be present in the surface of the bearing.

While there has been illustrated and described by way of example a particular manner of carrying out the improved process of the invention and a slightly modified manner of carrying out the process, it is to be understood that the invention is in no way limited to the particular application of the process so illustrated and described but that such changes in the various steps and in the order of the steps may be resorted to as come within the scope of the sub-joined claims.

Having now described the invention so that others skilled in the art may clearly understand the same, what it is desired to secure by Letters Patent is as follows:

What is claimed is:

1. A bearing comprising a dressed agglomerate body of alternate anfractuous laminations of different bearing materials bonded onto the surface of a machine element.

2. A bearing having a mottled bearing surface comprising a cross section of plural anfractuous laminations of different bearing materials.

3. A bearing having a variegated bearing surface comprising a cross section of alternate convoluted anfractuous laminations of different bearing materials.

4. A bearing comprising a dressed agglomerate body of anfractuous strata bonded onto the surface of a machine element, said bearing having a variegated bearing surface consisting of exposed portions of different strata of bearing materials.

5. A bearing comprising a dressed agglomerate body of anfractuous convoluted strata of alternately different materials formed directly onto the bearing receiving surface of a machine element, and machined to provide a smooth outer bearing surface of variegated areas of said different materials.

6. A bearing comprising a dressed agglomerate body of alternate anfractuous strata electro-deposited onto the bearing receiving surface of a machine element.

7. A bearing comprising a sleeve bonded to a machine element and having a surface formed of a plurality of different elements of bearing material, said sleeve comprising a plurality of layers of said different elements bonded together and arranged at various angles to said surface.

8. The method of forming bearings by an electroplating process which comprises, plating the bearing material receiving portion of a machine element with a layer of bearing material having an uneven outer surface, plating a layer of different bearing material on said first layer, increasing the number of layers of bearing material in a manner such that each layer has an uneven outer surface until the thickness of the plated body of bearing material is greater than the required thickness of said body when in finished condition, and thus subjecting the plated portion of the machine element to mechanical operations to reduce such bearing material to required dimensions and a smooth surface.

9. The method of forming bearings which comprises electroplating onto the bearing material receiving surface of a machine element a plurality of alternate layers of different constituent elements of the bearing material in such a manner that each layer varies in thickness and the various layers are intermixed with each other, controlling the thickness and multiplying the number of layers so that the thickness of the plated body of bearing material is greater than the required thickness of such body of bearing material when in a finished condition, and subjecting the plated portion of the machine element to mechanical operations to reduce such bearing material to required dimensions and surface finish.

10. The method of forming bearings which comprises roughening the bearing material receiving surface of a portion of a machine element, electroplating a plurality of alternate layers of different constituent elements of bearing material onto said roughened surface to a thickness of plated material greater than the required thickness of the body of bearing material when in a finished condition, and subjecting the plated portion of the machine element to mechanical operation to reduce said bearing material to required dimensions and surface finish and to provide in the surface of said bearing material contingent areas of different constituent elements of said bearing material.

11. The method of forming bearings which comprises roughening the bearing material receiving surface of a machine element by machining said surface to provide grooves therein, electroplating a plurality of alternate layers of different constituent elements of bearing material onto said grooved surface, to provide a thickness of bearing material on said surface greater than the required thickness of said body of bearing material when in a finished condition, and subjecting the plated portion of said machine element to mechanical operation to reduce said bearing material to required dimensions and surface finish and provide alternate areas of said different bearing material constituents in the surface of said bearings.

12. The method of forming bearings which comprises roughening the bearing material receiving surface of a machine element by subjecting said bearing portion to machine operations to provide grooves in said surface, subjecting said surface to a cleaning operation, electroplating a bonding or leveling lever of material upon said surface and electroplating a plurality of alternate layers of different constituent elements of bearing material over said bonding layer to provide a thickness of bearing material greater than the required thickness of said bearing material when in a finished condition, and subjecting the plated portion of said machine elements to mechanical operation to reduce said bearing material to required dimensions and surface finish and provide in the surface of said bearing material alternate areas of said different bearing material constituents.

13. A machine bearing comprising, a first layer of bearing material having a rough outer face, and a second layer of a different bearing material applied to the rough outer face of said first layer and worked down until projections on the face of said first layer project through said second layer.

14. A machine bearing comprising, a layer of bearing material having an uneven outer face, and a layer of a bearing material softer than the material of said first layer applied to the uneven face of said first layer and worked down until minute areas of said first layer project through said layer of soft material.

15. A machine bearing comprising, a first layer of bearing material having an uneven outer surface, and a second layer of a bearing material different from the material of said first layer electroplated onto the uneven surface of said first layer and provided with a smooth outer surface.

EARLE A. RYDER.